United States Patent
Potts et al.

(10) Patent No.: US 10,550,561 B2
(45) Date of Patent: Feb. 4, 2020

(54) WASTEWATER LEACHING CHAMBER

(71) Applicant: Geomatrix Systems, LLC, Old Saybrook, CT (US)

(72) Inventors: David A Potts, Lyme, CT (US); Daniel Borkowski, Meriden, CT (US); David Jewett, Old Lyme, CT (US)

(73) Assignee: GEOMATRIX SYSTEMS, LLC, Old Saybrook, CT (US)

( * ) Notice: Subject to any disclaimer, the term of this patent is extended or adjusted under 35 U.S.C. 154(b) by 0 days.

(21) Appl. No.: 15/677,281

(22) Filed: Aug. 15, 2017

(65) Prior Publication Data

US 2018/0044905 A1 Feb. 15, 2018

Related U.S. Application Data

(60) Provisional application No. 62/374,990, filed on Aug. 15, 2016, provisional application No. 62/472,281, filed on Mar. 16, 2017.

(51) Int. Cl.
*E03F 1/00* (2006.01)
*C02F 3/28* (2006.01)

(52) U.S. Cl.
CPC .............. *E03F 1/003* (2013.01); *C02F 3/288* (2013.01); *E03F 1/002* (2013.01); *E03F 1/005* (2013.01)

(58) Field of Classification Search
CPC . E03F 1/002; E03F 1/003; E03F 1/005; E03F 11/00; C02F 3/046; C02F 3/288
USPC ................ 210/170.08, 532.2; 405/43, 45, 46
See application file for complete search history.

(56) References Cited

U.S. PATENT DOCUMENTS

| | | | | |
|---|---|---|---|---|
| 2,637,170 A | * | 5/1953 | Benedict ................. | C02F 3/046 405/44 |
| 2,803,948 A | * | 8/1957 | Dorfman ................. | C02F 3/046 405/46 |
| 3,645,100 A | * | 2/1972 | La Monica ............. | C02F 3/046 405/46 |
| 4,188,154 A | * | 2/1980 | Izatt ....................... | E02B 11/005 405/43 |
| 4,192,628 A | * | 3/1980 | Gorman .................. | E03F 1/003 405/45 |
| 5,074,708 A | * | 12/1991 | McCann, Sr. ........... | E01C 13/02 405/43 |
| 5,785,454 A | * | 7/1998 | Ringdal .................. | E02B 13/00 405/43 |
| 5,890,837 A | * | 4/1999 | Wells ........................ | E03F 1/00 405/45 |
| 5,921,711 A | * | 7/1999 | Sipaila ..................... | E03F 1/003 405/45 |
| 7,374,670 B2 | | 5/2008 | Potts | |
| 2010/0178112 A1 | | 7/2010 | Potts | |
| 2013/0306572 A1 | | 11/2013 | Potts | |
| 2014/0212219 A1 | * | 7/2014 | Jowett ..................... | E03F 1/003 405/36 |
| 2014/0263006 A1 | | 9/2014 | Potts | |

* cited by examiner

*Primary Examiner* — Christopher Upton
(74) *Attorney, Agent, or Firm* — Grasso PLLC

(57) ABSTRACT

Wastewater leaching chambers and leaching channels are disclosed. The chambers may include a recess for receiving a wastewater supply, the recess serving to lower the overall height of the combined chamber and supply. The recess also configured to tightly seat the supply and form a gap therebetween. Leaching channels having a high aspect ratio may also be coupled to or otherwise in fluid communication with the chamber.

20 Claims, 8 Drawing Sheets

WASTEWATER LEACHING CHAMBER

CROSS-REFERENCE TO RELATED APPLICATIONS

This application claims priority to U.S. provisional application 62/374,990, which was filed on Aug. 15, 2016 and is entitled Leaching Gallery. This application also claims priority to U.S. provisional application 62/472,281, which was filed on Mar. 16, 2017 and is entitled Upper Loading Wastewater Leaching Chamber. Both the '990 provisional and the '281 provisional are incorporated by reference, in their entirety, into this application.

TECHNICAL FIELD

This application regards systems, apparatus, articles of manufacture, and processes involving wastewater treatment. More particularly, wastewater leaching galleries for use in residential, commercial, or industrial wastewater treatment systems are provided herein.

BACKGROUND

Wastewater treatment systems vary in size and scope. They can be sized for treatment of large amounts of wastewater from a municipality or other large cumulative systems for benefitting many residences, businesses, and industrial facilities serviced by the municipality. The wastewater treatment system can also be designed and sized for single home residential use and small scale residential and commercial uses.

In the small-scale applications, a wastewater treatment system will often include a septic or treatment tank that can receive wastewater, allow for solids from the wastewater to settle out and remove Biological Oxygen Demand (BOD), Total Suspended Solids (TSS), nitrogen, phosphorus, bacteria and pathogens, among other constituents. The wastewater treatment system will also often include an infiltration system downstream of the septic tank for receiving the wastewater from the septic tank, treating the wastewater, and for discharging the wastewater back to the environment for further treatment and groundwater recharge. The field can be comprised from pipes lying atop a bed of stone, concrete and plastic galleries, and a number of proprietary technologies.

BRIEF SUMMARY

Embodiments may include various systems, apparatus, articles of manufacture and processes involving wastewater treatment. These may include one or more wastewater leaching chambers configured to receive wastewater and to allocate the received wastewater for subsequent handling or treatment. Subsequent handling or treatment may be carried out below the chamber as well as in leaching channels in fluid communication with the chamber. Single or multiple chambers, as well as single or multiple leaching channels, may be used in embodiments. The chamber(s) may sit atop a treatment media, such as sand or other soil, as well as a manufactured filter material such as a filter fabric or filtering mat or crushed polymer materials or combinations thereof. These various wastewater receiving media may be considered to be Infiltration and Treatment Medium (ITM).

The leaching channels may be directly coupled to one or more of the leaching chambers, as well as being positioned a distance away from the leaching chamber(s). The leaching channels may be configured with a height to width aspect ratio, i.e., having a height to width aspect ratio in the range of 3 to 96, including 3 and 96. Exemplary nested ranges may include 5 to 85 and 7 to 80. Still other aspect ratios may also be employed within the overall 3 to 96 prescribed range. These leaching channels may be oriented in an upright manner and may be vertical. The leaching channels may comprise one or more pipes and may be wrapped in or otherwise in communication with an external filter medium.

The leaching chamber may be formed with male or female connectors for connection directly with one or more leaching channels. The leaching channels, in embodiments, may appear as outriggers extending from one or more of the leaching chambers. Sand, or another soil, or other treatment medium may surround one or more of the leaching channels and the leaching channels may be spaced in somewhat parallel orientations relative to each other or to at least one other leaching channel. The leaching channels may be positioned in other orientations as well.

Thus, embodiments provided herein are directed to systems, apparatus, articles of manufacture and processes regarding separation and purification of wastewater. Contaminants of the wastewater can include organic waste such as human waste, animal waste, and food plant waste, as well as other waste where organics are held in suspension or solution with the transport water. Grey water, black water, sewage, and food processing wastewater such as butchering wastewater or food mill wastewater are examples of organically contaminated wastewater.

Advantages of certain embodiments can include that wastewater contaminated with organic waste, including those mentioned above, can be treated to a high purification level while the system itself can occupy a small plan footprint and/or a small profile height, through, for example, the use of a lower profile leaching chamber and wastewater supply configuration. For example, and as described in more detail below, a leaching chamber with a recess may be employed such that the combined height of the leaching chamber, and the wastewater supply feeding the leaching chamber, has a height smaller than the combined individual heights of the wastewater supply and the leaching chamber. This reduced combined height may be provided by locating a recess on top of the leaching chamber in which the wastewater supply can partially or completely nestle within. A reduced footprint may also be provided in embodiments through overlap with adjacent leaching channels from nearby leaching chambers, through active air pressure used to increase bioactivity within the leaching channels, and through other means as well.

In embodiments, the recess may also include one or more passages configured and positioned such that wastewater reaching the recess can pass from outside the leaching chamber, through the passage(s), and into the leaching chamber. A recess may be further configured such that the outer shape of the wastewater supply does not mimic or otherwise perfectly match the recess. For example, if the wastewater supply is a pipe with a circular outer surface, the recess of the leaching chamber may be in the shape of a V or an oval such that the bottom surface of the V or the oval does not touch the outer surface of the pipe. This gap between the pipe and recess of the leaching chamber may receive wastewater exiting the pipe and flow downwards, through a passage, and into the leaching chamber. The pipe may discharge water through its walls or through an end of the pipe and through other configurations as well.

Numerous embodiments are possible beyond those specifically described above and below. The embodiments described here are illustrative and should not be considered to be limiting. This includes that processes described herein may be undertaken in various orders unless a specific order is called for in the applicable claim or description. Moreover, fewer or more features or actions may accompany those specifically described herein. Likewise, disclosed embodiments, whether in the brief summary or detailed description may be further modified, including being altered using features and processes selected from different embodiments and using features and processes in different orders and configurations.

There are various adaptations of embodiments, and many permutations that may be employed within the spirit and scope of this disclosure. Those of skill will understand that the invention is not to be limited to only those embodiments described herein and that other embodiments and applications consistent with the teachings herein would also fall with the scope of this disclosure. For example, and as explained in more detail below, these other permutations can include variations in orientations of the leaching channels, the surrounding ITM, the connections between the leaching chamber(s) and the leaching channels, and the configuration of the leaching channels themselves, as well as still other permutations.

DETAILED DESCRIPTION

Figure 1:
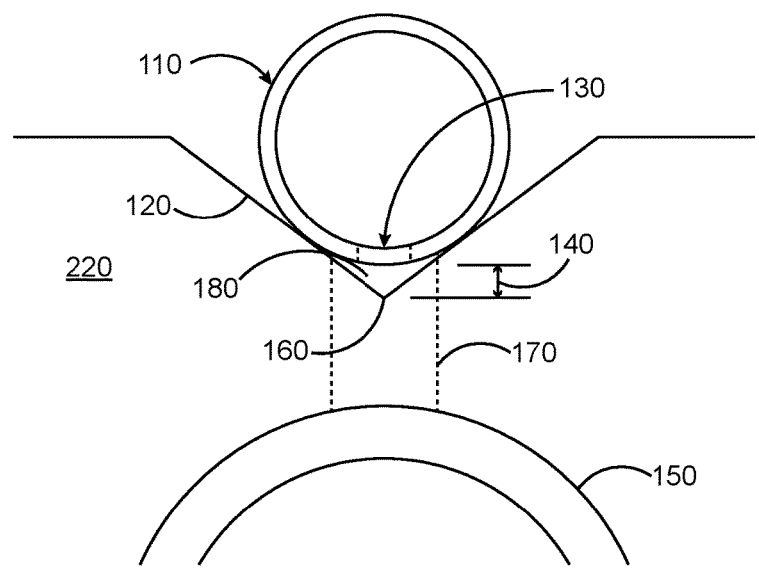
FIG. 1 shows an enlarged portion of the end-side view of the leaching chamber and leaching channels shown in FIG. 2 as may be employed in embodiments.

As noted above, embodiments may include various systems, apparatus, articles of manufacture, and processes involving wastewater treatment. These may include wastewater leaching chambers configured to receive wastewater and to allocate the received wastewater for subsequent handling or treatment. Subsequent handling or treatment may be carried out below the chamber as well as in leaching channels in fluid communication with the chamber. Single or multiple chambers, as well as single or multiple leaching channels, may be used in embodiments. The chamber(s) may sit atop a treatment media, such as sand or other soil, as well as a manufactured filter material, such as a filter fabric or filtering mat or crushed polymer materials, combinations thereof, or still other ITM. The leaching channels may be directly coupled to one or more of the leaching chambers, as well as being positioned a distance away from the leaching chamber(s). For example, the leaching channel outrigger support may extend from the leaching chamber while the wrapping geotextile or other interface may not begin for several inches down the outrigger support. The leaching channels may be configured with a height to width aspect ratio, i.e., having a height to width aspect ratio in the range of 3 to 96, including 3 and 96. Other applicable ranges are provided above. These leaching chambers may be oriented in an upright manner and may be vertical. The leaching channels may comprise one or more pipes and may be wrapped or otherwise in communication with a filter medium. The chamber may be formed with receptacles for connection directly with one or more of the leaching channels; and the leaching channels, in embodiments, may appear as outwardly reaching appendages extending from one or more of the leaching chambers. The leaching channels may be formed with certain ITM, such as geotextile fabric, geotextile mats, polymer grids, or other materials that can receive wastewater and serve to dispense it to surrounding ITM. Sand, or another soil, or other ITM may surround one or more of the leaching channels, and the leaching channels may be spaced in somewhat parallel orientations relative to each other or to at least one other leaching channel.

The leaching chamber may be manufactured using various materials, including composite constructions containing different nonhomogenous materials. For example, the leaching chamber may be made from concrete as well as from plastics or other polymers. One or more of the walls of the chamber, as well as sections of the walls, may be pervious or impervious to water. In other words, water may not readily flow through any of the walls of the chamber, but the chamber may also contain one or more walls, or sections of the walls, where water may readily flow through or may only readily flow through a portion of the wall.

From above as well, the chambers may include a recess for receiving a wastewater supply, and this recess may contain a passage such that wastewater reaching the recess can pass from outside the leaching chamber, through the passage, and into the leaching chamber. This recess may be further configured such that the outer shape of the wastewater supply does not mimic or otherwise perfectly match the recess. For example, if the wastewater supply is a pipe with a circular outer surface, the recess of the leaching chamber may be in the shape of a V or an oval such that the bottom surface of the V or the oval does not touch the outer surface of the pipe. This gap between the pipe and recess of the leaching chamber may receive wastewater exiting the pipe and flow downwards and into the leaching chamber. The pipe may discharge water through its walls or through an end of the pipe and through other configurations as well.

Embodiments may comprise an open bottom concrete, plastic composite, or other structurally sound material to form or define a center chamber, which may also be called a gallery. The chamber may have receptacles or other connectors near or on the bottom and top of its perimeter walls to receive or otherwise connect to outrigger supports that support a high aspect ratio leaching channel and allow for flow of water from the interior of the chamber into the interior of the high aspect ratio leaching channels. The receptacles or other connectors may be positioned in or outside of the perimeter walls of the chamber or elsewhere, such that adjacent high aspect ratio channels have between about 2 and about 12 inches between adjacent facing infiltrative surfaces of nearby channels, thereby allowing for sand or other backfill to be placed in these spaces between the facing infiltrative surfaces of adjacent leaching channels.

The outrigger supports are preferably sufficiently rigid to support and tension the high aspect ratio leaching channels such that the desired separation between sidewall infiltrative surfaces can be accurately and consistently maintained until the sand backfill can be placed. The outrigger supports may be shaped to be pipe-like, but preferably have an opening that corresponds with the permeable core of the high aspect ratio leaching channel. In other words, when an outrigger support is positioned along the upper portion or top of a leaching channel the outrigger support may be configured as a pipe with a long lateral opening or a plurality of openings such that wastewater entering the outrigger from the chamber may flow downwards into the leaching channel. The outrigger may be further configured such that its distal end, the end furthest from the chamber, is closed. Having this closed end preferably will result in most, if not all, wastewater entering the outrigger to be discharged into the leaching channel. In embodiments, the lower outrigger support may not be fluidly coupled to the inside of the leaching chamber. In so doing, wastewater may accumulate in the chamber and either be dissipated down, through the bottom of the chamber, when the chamber has an open bottom or permeable bottom, or overflow into the leaching channels when wastewater level reaches the discharge height of the upper holes of the outriggers fluidly connected to the inside of the leaching chamber. Comparatively, in embodiments, the lower outrigger may be fluidly coupled to the inside of the leaching chamber. In so doing, wastewater may accumulate in the chamber and the leaching channels wherein the chamber and the channels may effectively fill at about the same rate or time and wastewater may infiltrate through the infiltrative surfaces in the leaching channels and the leaching chamber. In embodiments, the leaching chamber may have infiltrative surfaces on its bottom and on its sides.

The bottom or invert elevation of the leaching chamber is preferably within a few inches of, or the same as, the bottom or invert elevation of the lower leaching channel, although other configurations are also possible. When the outrigger receptacles or connectors are configured for the flow of wastewater from the chamber to the lower outrigger of a leaching channel, the shared elevation configuration preferably serves to ensure that wastewater will be evenly distributed to the bottoms of all high aspect ratio channels.

The leaching chamber dimensions can vary, but in preferred embodiments are approximately 12 inches wide or wider and from approximately 6-40 inches tall or higher. The height of the high aspect ratio of the leaching channels may be slightly shorter or higher than the height of the leaching chamber(s). In embodiments, pressure may be developed from gravity flow or active means to promote wastewater flow into the leaching chamber and into the leaching channels. The combination of the high aspect ratio leaching channels and the leaching chamber can provide a system that may handle high peak water flows and attenuate these peak flows, while also providing a high capacity wastewater treatment system.

Embodiments of the invention may also include pressurized and/or gravity fed wastewater distribution conduits positioned at or near the top of the leaching chamber or in fluid communication with the leaching channels. In embodiments, the leaching chamber and the leaching channels may contain a hollow and may be made from various materials, including concrete, masonry, plastic, wood, and ceramic. The leaching chamber may be fed by a pressurized or gravity fed distribution wastewater supply, such as a corrugated or smooth pipe having discharge orifices. The supply may be positioned over portions of the leaching chamber with the discharge orifices of the wastewater supply facing towards the leaching chamber. These orifices may preferably discharge wastewater into the top or near the top of a leaching chamber as well as into or near other portions of the wastewater treatment system. The wastewater supply may be configured and utilized for gravity flow or pressure distribution or both. The wastewater supply may also be held in place or secured to some extent with receivers and/or by a receiving indentation in the leaching chamber as well as other portions of the wastewater treatment system. The receivers may be in the form of a "C" clamp, a "V" clamp, a tiered or stepped recess as well as other configurations, and the receiving indentation may be in various configurations as well and may be preferably adapted to receive and/or hold the supply during installation and/or during use. These receiving recesses or indentations can include grooves, different shapes, notches, receptacles, and cut outs. In either receiving system, i.e., receivers or receiving indentation, the wastewater supply is preferably held in place such that the orifices face downward, towards the leaching chamber or other portion of the wastewater treatment system, and the orifices are preferably shielded from soil clogging. This shielding can be created by a sealed mating of the leaching chamber or other portion of the wastewater treatment system and the conduit, by placing geotextile fabric over the wastewater supply and the chamber, as well as by other designs and adaptations.

In embodiments, through the upper positioning of the wastewater supply in the recess and relative to the leaching chamber or other portion of the wastewater treatment system, the effective amount of depth of the wastewater treatment system may be improved or optimized. In other words, as the wastewater supply is positioned at or near the top of the leaching chamber or other portion of the wastewater treatment system, the available depth below the wastewater supply, in the leaching chamber or distributed leaching field or other portion of the wastewater treatment system may be at or near the total height of the system. This optimization may preferably result in 10%-40% or more of additional wastewater capacity rating for the leaching chamber, treatment system, or other rated system in some embodiments. By placing the wastewater supply on top of the leaching chamber or other portions of the wastewater treatment system, construction of the piping system may be greatly simplified over hanging a supply pipe on the inside top of the chamber or other portions of the wastewater treatment system. Additionally, over time, supply pipes that have been suspended inside or hung in the top of the chamber or other portions of the wastewater treatment system end up lying on the bottom of the chamber or other portion of the wastewater treatment system when the materials utilized to suspend the supply pipe degrade.

When wastewater supplies are simply placed on top of a leaching chamber, without a recess in the leaching chamber, the wastewater treatment system has a taller profile that can result in a taller mounded area over the wastewater treatment system. Even an inch lower saves in cover material and improves aesthetics. By providing a recess to accept and retain the wastewater supply, construction and backfilling may be simplified in embodiments.

The wastewater treatment systems employing the leaching chambers and leaching channels may be comprised of various materials including GeoMat™, erosion control mattresses, stone trenches, plastic chambers, drip tubing, fabric wrapped pipe, polystyrene aggregate systems, cuspated systems, prefabricated concrete structures, and other systems utilized for wastewater treatment system construction. The use of GeoMat™ as part of the leaching channels may be preferred in embodiments because of its thin profile, aerobic nature, and capability to uniformly transition wastewater to an Infiltration and Treatment Medium (ITM) interfacing with the leaching channel.

In embodiments, a treatment gas, such as air or oxygen, may be periodically or continually pumped into the wastewater treatment systems. In embodiments, the collection and distribution channels may include piping within them to receive and then distribute treatment gas within and possibly throughout the leaching chamber and/or leaching channel and/or other components of the wastewater treatment systems.

Throughout the disclosure it should be understood that the wastewater travelling into and through the embodiments can have changing levels of contaminants where the level of contamination for the wastewater may diminish as it moves through the treatment train. Thus, the level of contaminants in the wastewater after is has left the leaching channels and travelled through the ITM may be far less than the level of contaminants in the wastewater when it is first introduced into the wastewater treatment system for the first time. This use of the word wastewater is intended to assist the reader and simplify references throughout the disclosure. In addition, the wastewater disclosed herein may include waste related to human waste and may be originating at a single residence or commercial location, or from an accumulation of residences and commercial locations, as may be done locally as well as at an industrial wastewater treatment facility.

The leaching chamber may be manufactured using various materials, including composite constructions containing different nonhomogenous materials. For example, the leaching chamber may be made from concrete as well as from plastics or other polymers. One or more of the walls of the chamber, as well as sections of the walls, may be pervious or impervious to water. In other words, water may not readily flow through any of the walls of the chamber, but the chamber may also contain one or more walls, or sections of the walls, where water may readily flow through or may only readily flow through a portion of the wall.

In embodiments, the flow line leading to the wastewater supply over the leaching chamber may be elevated through the positioning of the wastewater supply. This increased elevation may allow more soil to be in contact with the leaching chamber or other portion of the wastewater treatment system for infiltration.

In embodiments, and as shown in certain accompanying figures, discharge orifices of a wastewater supply sitting atop the leaching chamber may be protected by close mating between the supply and the leaching chamber or other portion of the wastewater treatment system. This close mating may create a protective void or gap between the supply and a leaching chamber or other portion of the wastewater treatment system. In embodiments, the wastewater supply, which may be a distribution pipe or other distribution conduit, may be positively located and secured to the leaching chamber or other portion of the wastewater treatment system such that the pipe or conduit or other wastewater supply has little or no unwanted movement prior to backfilling or later on, i.e., during use.

Embodiments may also be vented at the top or near the top of the leaching chamber or other portion of the wastewater treatment system, which may provide for improved venting or more efficient venting.

As noted above, embodiments may result in a lower overall system profile when the wastewater supply is received in a depression or recess of the leaching chamber or other portion of the wastewater treatment system when compared to placing the conduit directly atop a flat leaching chamber or other portion of the wastewater treatment system. In embodiments, locating the wastewater supply at or near the top of the leaching chamber or other portion of the wastewater treatment system may provide a better distribution of wastewater in the leaching chamber or other portion of the wastewater treatment system than running a distribution conduit on the bottom of a chamber or other portion of the wastewater treatment system on the soil surface, or on the inside top of the leaching chamber or other portion of the wastewater treatment system. When the wastewater supply is simply placed on top of the leaching chamber in stone, the profile is increased and the wastewater has to travel over the top of the system and then finds its way into the leaching chamber from outside. This circuitous path can result in overloading of wastewater to certain regions relative to others. When the wastewater is put directly into the leaching chamber, the wastewater is applied to the soil more uniformly.

Embodiments can include systems to treat wastewater constituents, with a focus on nutrient removal, such as nitrogen or phosphorus removal. Embodiments may target nitrogen removal by directing wastewater and perhaps air over treatment media and recirculating captured wastewater back to the front end of the treatment system. This captured wastewater can represent a fraction of the total wastewater treated by the system. For example, embodiments may collect about a half, third, sixth, thirty-sixth, sixty-fourth, etc. of the total wastewater after it has moved through the treatment media in a leaching field and return this collected wastewater back to the front or an upstream area of the treatment train. Recirculation of collected wastewater may be accomplished by various methods including by pumping, by blowing, and by partial vacuum. Thus, collected wastewater as well as vapor containing collected wastewater, may be returned upstream into the treatment system in embodiments. In some preferred embodiments, recirculation may be accomplished without creation of significant amounts of sludge in the system or considerable maintenance and oversight of system operation by a system operator or a system owner or both. Still further, improved power consumption and improved cold weather performance may be benefits of some embodiments.

In embodiments, wastewater from a wastewater source, such as a home, restaurant, storefront, or other location where wastewater is impacted by human activity, may enter a treatment tank that can provide for separation and clarification by density of the wastewater. Clarified wastewater may then flow out of the treatment tank and enter a leach field. In embodiments, this wastewater may then travel downwardly, under the force of gravity, in a leaching field and, in certain embodiments, from an induced pressure gradient as well. This pressure gradient may be generated by a blower or vacuum moving air and wastewater downwardly through the treatment media of a leaching field. For example, a vacuum may be used by itself to create the pressure gradient or to supplement a blower when creating pressure gradients in the system that act on wastewater moving in a leach field.

In embodiments, the collector can be a permeable collection device or system as well as an impermeable device or system. Whether the collector is an impermeable pan or permeable collection device, the collector may be configured to cover a broader or narrower area beneath the leaching conduits to adjust the amount of wastewater that may be collected relative to what is allowed to return to the environment. In other words, in embodiments, the collector can be a collection device that underlies the entire leaching area or only a portion of the leaching area such that a percentage of the wastewater may be recirculated back to the septic tank or other upstream area of the treatment train and the remaining percentage is allowed to pass to the environment. Moreover, in embodiments, only some of the collected wastewater may be recirculated and the remainder may be discharged to the environment, retained for later recirculation, or stored for subsequent removal and transport away, and combinations thereof. Still further, other outcomes may also be possible for collected wastewater.

In embodiments, the wastewater that is collected may be moved into a separator where solids, liquids and gases may be separated. Any liquids that are entrained in an associated gas or as a vapor may collect in the bottom of the separator. The gas fraction may either be returned to atmosphere or to a filter device for removal of odors, greenhouse gases, etc. The liquid, generally wastewater containing nitrate in preferred embodiments, may be returned to the front end of the septic tank, ideally through a spreading device in the septic tank to load the tank uniformly, where the wastewater can react with the microorganisms and carbon fraction of the tank contents, further providing denitrification. The rate that embodiments return wastewater to the front end of the septic tank is preferably slow in order to preferably enhance denitrification. The recirculation rate can be adjusted by the sizing the collectors, recirculator flow rates and recirculator run times and by recirculator sizing and operation.

In embodiments, a configuration of the leaching channels may use a reduced footprint that limits or eliminates loading of wastewater into trenches that are too close together. In embodiments, alternating trenches may be manifolded together into, for instance, a first grouping or zone and a second grouping or zone, e.g., "A" and "B" groups or zones.

In embodiments, an unlimited number of zones could be utilized (A, B, C, O, . . . Z) with an unlimited number of trenches per zone. In embodiments with A and B trenches, i.e., trenches in both the A and B zones, A trenches may be manifolded together and B trenches may be manifolded together, then these zones may be dosed independently such that wastewater infiltration from the trenches does not compete for the same space in the surrounding soil or competes for only a portion of the same space in the surrounding soil. In operation, the dosing of the A trenches may occur and then, at a later time, the dosing of the B trenches may be subsequently made.

In embodiments, the dosing interval between the A trenches and the B trenches can range from hours to days apart, depending on soils and wastewater characteristics. In embodiments, it may be preferred to allow for the individual trenches to fully infiltrate any given dose so as to reduce competition with neighboring trenches. Preferably, the zone dosing intervals may not be set too close together in order to avoid diminished hydraulic capacity, treatment, and lifespan. In preferred embodiments, dosing may utilize, for example, the A zone for a week and the B zone for the following week. The one-week off-line rest interval may result in any biomat that has developed while on-line to breakdown before going back on-line. The rest interval can be adjusted for soils, wastewater, and other variables. Still further, dosing intervals between zones can be set by volume of wastewater being treated such that once a threshold of water has passed to a trench leaching zone that zone is not used and a different zone is used until the volume is reached and a subsequent switch can occur. This volume may be on the scale of thousands of gallons and thousands of cubic feet of water, e.g., 1,000; 2,500; and 5,000 gallons per dosing cycle, or the volume can be configured on the desired flow of each lateral and be in the range of tens to hundreds of gallons of water.

In embodiments, dosing can be alternated by opening or closing zone valves, pumps, and by a variety of automated controllers and valves. In certain instances, supplemental air can be directed to the zones to enhance performance. In embodiments, alternating doses of supplemental air to approximately 33%-50% of the available system capacity or rating may increase hydraulic capacity, treatment and lifespan of the system. In other words, in embodiments a portion of the leach field system may alternatively receive doses of supplemental air sized for 33% to 50% of the total system capacity or rating, and this reduced dosing may serve to improve hydraulic capacity, treatment, and lifespan of embodiments. Thus, system overdesign can be used in embodiments to promote capacity, treatment, and lifespan.

In embodiments, the leaching channels may also comprise polystyrene aggregate incorporated into suitable netting or blanket. For example, the type of polystyrene aggregate associated with the commercial product EZflow Drainage Systems may be used. EZflow drainage systems are manufactured by RING Industrial Group, LP, 65 Industrial Park, Oakland, Tenn. 38060. When soil conditions are favorable, and there is not a great risk of moving fine grained material from the surrounding soil, it might be acceptable to eliminate the surrounding geotextile layer of the leaching chamber embodiments of the invention.

Additional ITM that may be employed, in whole or in part, in embodiments include: crushed stone, pea stone, wood mulch and chips, crushed glass, ground rubber, tire chips, and round stone.

Figure 2:
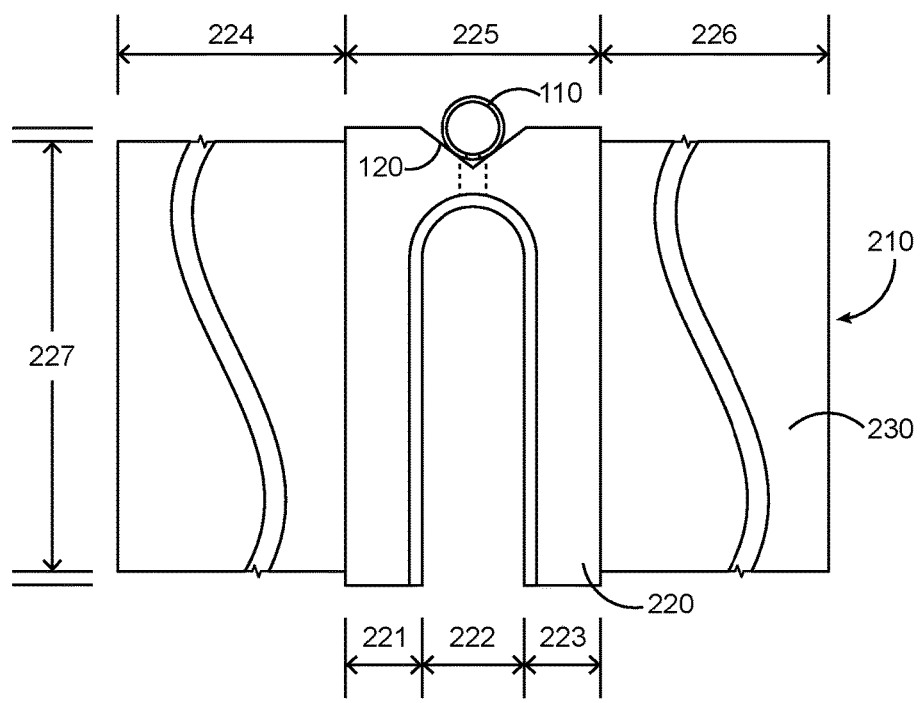
FIG. 2 shows an end-side view of a leaching chamber and leaching channels as may be employed in embodiments.
Figure 3:
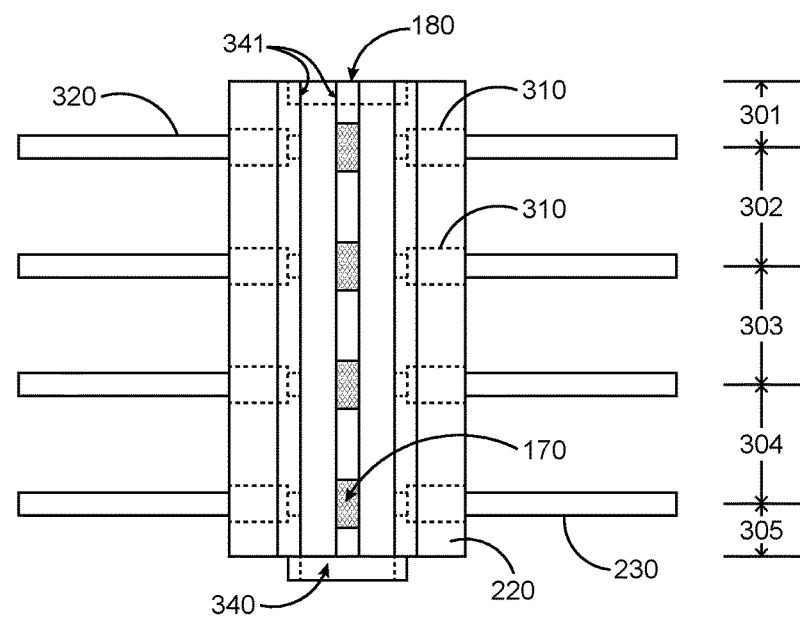
FIG. 3 shows a top view of the leaching chamber and leaching channels of FIG. 2 as may be employed in embodiments.

FIGS. 1-4 show top, side, and enlarged views of portions of a wastewater treatment system as may be employed in embodiments. FIG. 3 shows a top view of portions of a wastewater treatment system having a concrete chamber with extending leaching channels attached thereto and an overlying receiving recess for a distribution pipe. Spacing between leaching channels or other components of the wastewater system are labeled at various points in the figures. In embodiments, the leaching channels may comprise GeoMat™ or cupsated S-Box as a leaching material or other materials for enhanced leaching into surrounding soil, which may be sand, soil, polymer fill, and other suitable treatment media.

FIG. 1 shows an enlarged portion of the side-end view of the wastewater system of FIG. 2. Labeled in FIG. 1 are the wastewater supply 110, the distribution orifice 130, the recess 120, the gap 140, the recess apex 160, the leaching chamber 220, recess passage 170, and inner chamber 150. This enlarged portion shows how discharge orifice holes 130 discharge into a sealed space 180 between the recess 120 and the wastewater supply 110. This sealed space 180 is somewhat triangular shaped because the recess 120 has a V shape.

Other sealed space shapes may also result. For example, if the recess has an oval shape, a more rounded gap may be formed, and if the recess were rectangular a somewhat rectangular gap may be formed. As can be seen, the sealed space 180 has a gap 140, which is preferred to be 0.25" in height or larger. Ghost lines show how wastewater may flow through the recess passages 170 from the recess 120 to the large open inner portion 150 of the chamber 220. Once in the chamber, the wastewater may then flow through one or more of the receptacles or connectors and to the leaching channels extending from the chamber.

FIG. 2 shows an end side view of the wastewater system with a chamber 220 and leaching channels 210 as may be employed in embodiments. The leaching channels 210 may have various lengths as shown by illustrative breaks in each leaching channel 210. Exemplary dimensions may include 19"-34" for 224 and 226; 10"-12" for 225; 7.7", 11.7", and 17.7" for 227; 3" for 221 and 223; and 4" for 222. These dimensions are exemplary and may be modified in embodiments. The end side view also shows a V shaped recess 120 with wastewater supply as may be employed in embodiments. As can be see, the V recess is more than half of the diameter of the supply 110. In so doing the full diameter of the supply 110 need not sit above the chamber 220. The V shaped (or other shaped) recess 120 is preferably sized to allow a variety of pipes sizes, typically 1" to 4" ID. Pressurized distribution pipes may have IDs of ⅛", ½", and 1" or more while gravity fed distribution pipes may have larger IDs ranging from 1" to 4" or more. However, different diameters for both gravity fed and pressurized distribution pipes may be employed in embodiments. The V shaped (or other shaped) recess may also have different shapes formed into it to accept different sized pipes. In embodiments, the leaching conduit may be a circular pipe and the recess can have a depth of at least 9/10 the diameter of the leaching conduit. Also labeled in FIG. 2 are the leaching channel sidewall infiltrative surface 230, which may be filter fabric placed or stretched around outrigger supports, which are shown at 320 of FIG. 4, extending from the chamber 220.

FIG. 3, among others, shows how the recess passages 170 may lie along the center of the chamber 220 and the center of the recess and the sealed space 180. These passages 170 may coincide with the leaching channels 230 to facilitate wastewater travel from the wastewater supply seated or otherwise positioned in the recess. The recess passages may also coincide with enhanced receiving details of the chamber such that tight sealing between the chamber recess and the wastewater supply may be present in these four passages. In other words, one or more of these passages 170 or the recess 120, as labelled in FIG. 1, itself may have edges configured to tightly mate with the wastewater supply in order to deter or prevent soil, such as sand, from reaching recess passages of the leaching chamber in this area and clogging the recess passages.

In this top view shown in FIG. 3, 16 schedule 40 PVC couplers 310 have been cast into the concrete chamber with the top eight visible in the top view. The conduit can also be configured to pipe water from the distribution conduit directly to the couplers feeding the outrigger supports 320. Other variations are also possible. Also visible in this top view are the male 340 and female 341 connections for the chamber located at the ends of the chamber. These connections are shown with phantom lines and can allow for sequential coupling of chambers one after another in an end-to-end fashion. Spacings 301 and 305 may be 2.5"±0.5", while spacings 302-304 may be 5"±0.5" Other spacings and nonuniform spacing may also be employed in embodiments.

Figure 4:
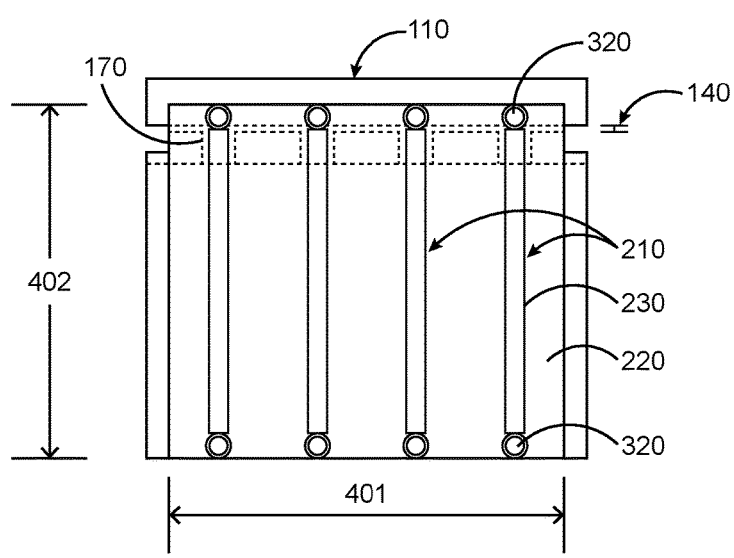
FIG. 4 shows a side view of the leaching chamber and leaching channels of FIG. 2 as may be employed in embodiments.

FIG. 4 shows a side view of the chamber and leaching channels as may be employed in embodiments. The wastewater supply 110, which is shown as a pipe, may be made from PVC or polyethylene and may have various diameters, including 1", 2", 3", and 4". The recess in the chamber may create a 0.25" gap 140 or more between the supply 140 and the chamber recess when the supply is seated in the chamber recess. The height of the chamber and the side leaching channels may vary and may include 8", 12" and 18" heights 402. As can be seen, in this side view, the side leaching channels may have top and bottom outrigger supports 320 that are connected to the couplers 310 of the chamber. Also visible is that the leaching channels 210 may have a rectangular cross-section and may have a height to width aspect ratio of 3 or 96 or in between 3 and 96 as well as the other sub-ranges mentioned herein. The leaching channels may be wrapped in filter fabric, may comprise a geonet or other synthetic material or matting, and may be spaced 2", 4", 6", 12" and other distances apart. The leaching channels may also have various thicknesses, including 1", 2", and 3". The ghost lines in the side view show, among other things, the wastewater supply sitting in the recess and the recess passages of the chamber.

Figure 5:
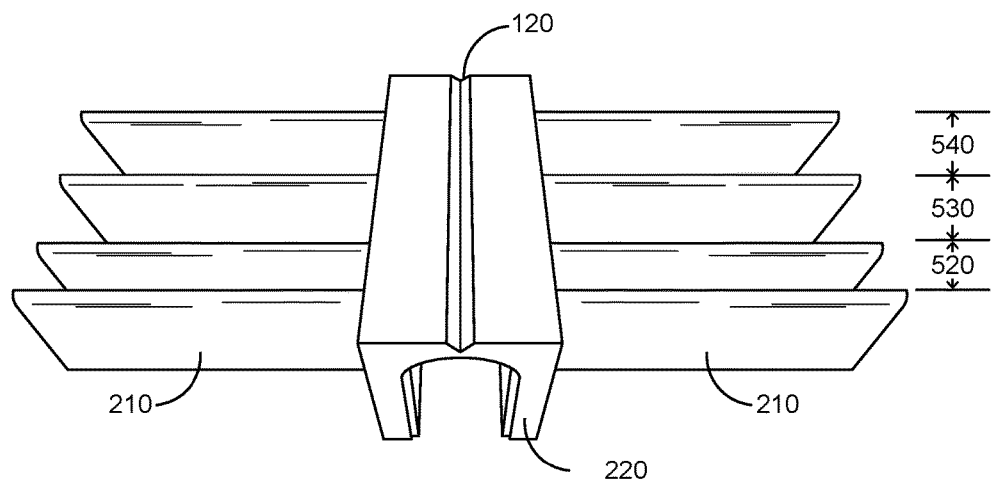
FIG. 5 shows a perspective top view of a leaching chamber and leaching channels as may be employed in embodiments.

FIG. 5 shows an assembled leaching chamber 220, with recess 120, and leaching channel wastewater system as may be employed in embodiments. Each of the leaching channels includes outrigger support pipes and an encircling geonet and surrounding geotextile that is supported by the pair of outrigger support pipes. Each leaching channel 210 is vertical in orientation, and the leaching channels are substantially parallel to each other. The spacing may be different between the channels as shown in FIG. 5, where spacings 540 and 530 may be equivalent to each other but larger than spacing 520. As can also be seen, the channels on the left and right side of the leaching chamber 220 may be aligned with each other. In other embodiments, however, the leaching channels on either side of the chamber may not be aligned with each other. This spacing may vary in uniform and nonuniform increments and may include 2", 4", 6", 8", and 10" spacings. As noted above, the outrigger support pipes may be coupled to various components and these can include filter fabric wraps, hard plastic shells, open volumes, partially open volumes, and other configurations as well.

A geotextile used as an interface for the leaching channels may be obtained from various manufacturers, and may include such geotextiles as Grasspave2, Gravelpave2, Rainstore2, Slopetame2, Draincore2, Surefoot4, Rainstore3 from Invisible Structures, Inc., 1600 Jackson Street, Suite 310, Golden, Colo. 80401, and Advanedge® flat pipe from Advanced Drainage Systems, Inc. 4640 Trueman Boulevard, Hilliard, Ohio 43026.

Still further, a geotextile interface may be comprised of an irregularly coiled stringy structure contained between one or two layers of air-permeable sheeting, which layers may feel to the touch like thin felt. In embodiments, the geotextile interface may have only one layer and one side of that layer may have an irregularly coiled string plastic structure.

Further discussions of leaching channels and high aspect leaching channels are discussed in U.S. patent publication 2013/0126407, entitled Leach Field System. That '407 publication is incorporated herein, by reference, and in its entirety.

Figure 6:
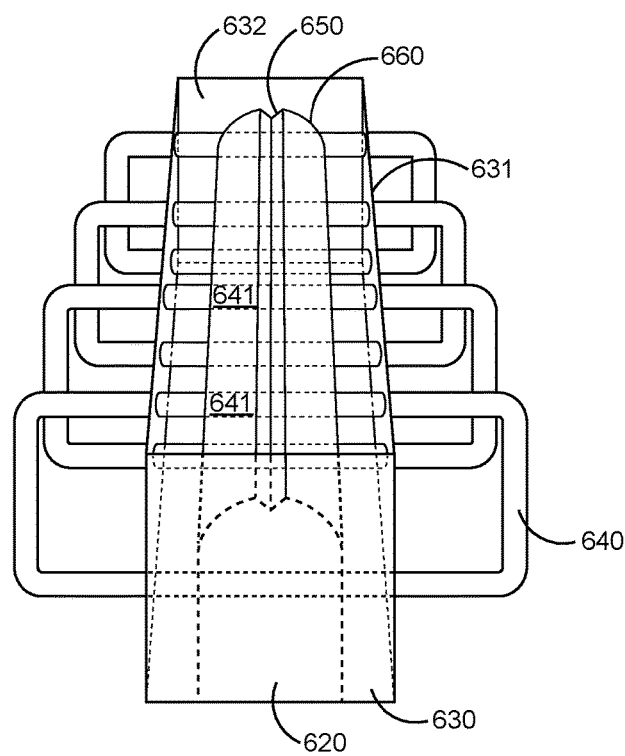
FIG. 6 shows a perspective top view of a leaching chamber forming system as may be employed in embodiments.

FIG. 6 shows a form as may be used in a process of manufacturing the leaching chamber and high aspect ratio leaching channels. As can be seen, a form 630 may be shaped and then filled with concrete around spacing jigs 640 for the outrigger supports. Form wall 632 and the internal form 641, which may be tubular, rectangular, square, polygonal, or other external shape, of the spacing jigs 640, are also labelled in FIG. 6. The spacing jigs may be made from various materials and may be preferably long enough to extend though both sides of the form 630. These materials may be pipes, rods, plates, beams, and other materials that may create a void space in the curing concrete that can form a receptacle. A coupling may also be held in place by the by the spacing jig or form and may remain after any jig and the form is removed and the concrete is set. These spacing jigs 640 may set various combinations of outrigger supports including upper and lower support outrigger spacings as shown in FIG. 1. The spacing jigs may have other configurations as well and may remain in the concrete chamber once the chamber is formed. In other words, the spacing jigs may form openings into the chamber and may remain to provide securement for the leaching channels that may be attached to the leaching chamber. Other jig combinations may include top spacing jigs and lower spacing jigs. In embodiments, the concrete may be 3000 psi concrete as well as various permutations, including high-strength concrete, low-density concrete, and fast-setting concrete. An insert 620, which is not visible when the concrete is placed, may be used in preferred embodiments to define the internal void space of the chamber formed by the concrete. The insert 620 may include a recess 650 and an arch 660 top that each work to form the internal and external surface area of the chamber being formed.

Figure 7:
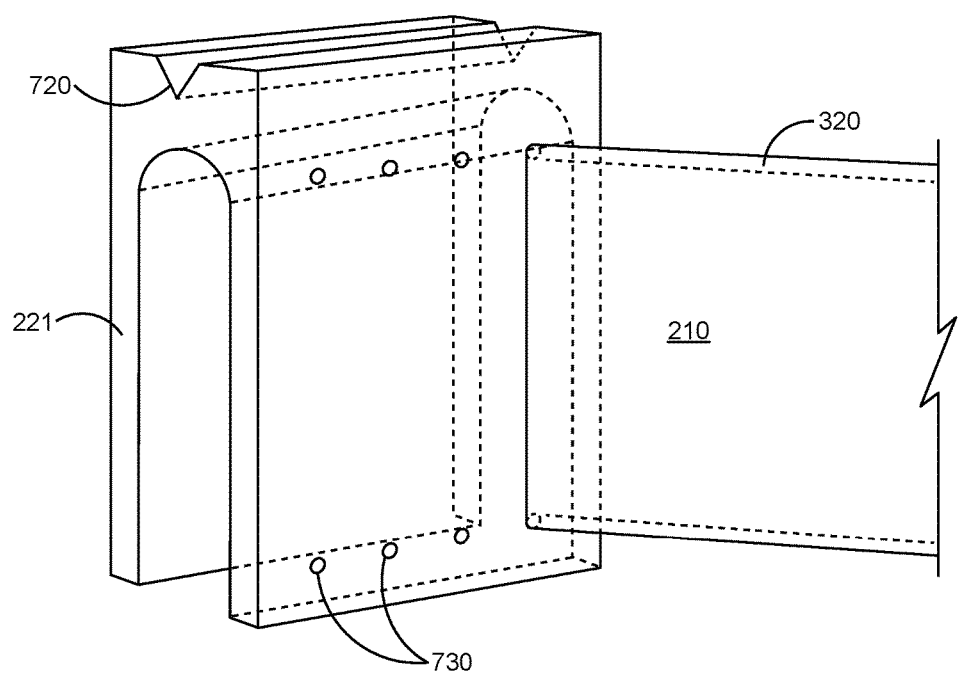
FIG. 7 shows a perspective side view of a portion of a leaching chamber and a directly coupled leaching channel as may be employed in embodiments.

FIG. 7 shows a side perspective view of a wall of a leaching chamber as may be employed in embodiments. Support outriggers 320, leaching channel 210, recess 720, couplers 730, and wall 221 are shown in FIG. 7.

Figure 8:
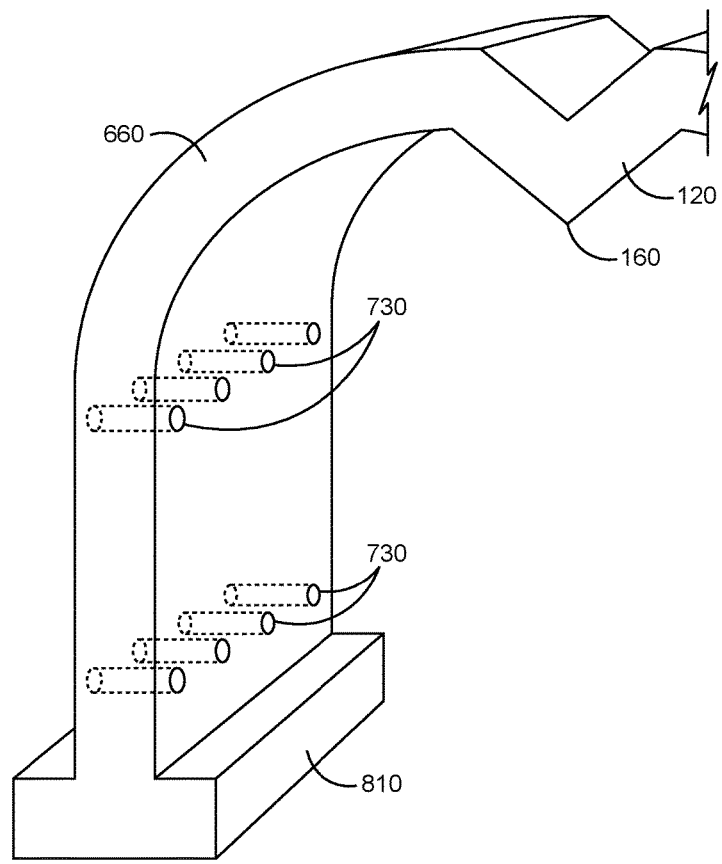
FIG. 8 shows a perspective end view of a portion of a leaching chamber as may be employed in embodiments.

FIG. 8 shows a side view of a section of a formed concrete leaching chamber as may be formed with the form in FIG. 6. Labeled in FIG. 8 are the recess apex 160, the recess 120, the chamber walls 660, the support outrigger couplers 730 and the foundation 810. As can be seen, four pairs of couplers 730 remain in the chamber wall for receipt of support outriggers and enwrapping filter fabric or geotextile, or other material forming the high aspect ratio channels supported by the support outriggers. Other numbers of leaching channels and their constituent components may also be used in embodiments. Moreover, opposing pairs of leaching channels, i.e., one on each side of the leaching chamber may be employed, and staggered placement of the leaching channels, where leaching channels do not align across the leaching chamber, may also be employed in embodiments. The open body of the leaching chamber, as may be employed in embodiments, is shown in FIG. 8.

FIG. 8, among others, also shows how the chamber may also be fitted with couplers to allow wastewater to flow from the chamber to the leaching channels. These couplers may also serve to allow for securement of the leaching channels to the chamber. These couplers may also be connected to the wastewater supply for direct transfer of wastewater from the wastewater supply to one or more leaching channels. Other connectors may also be used to connect the wastewater supply directly to one or more leaching channels. These connectors may be pipe, expandable fabrics, and other materials. FIG. 8 also shows the internal space of the chamber after is has been removed from the form. As can be seen, the lower receptacles for the outriggers extend through the walls of the chamber and, therefore, allow fluid flow from within the gallery chamber to the high aspect ratio channels or other systems attached to the outriggers.

Figure 9:
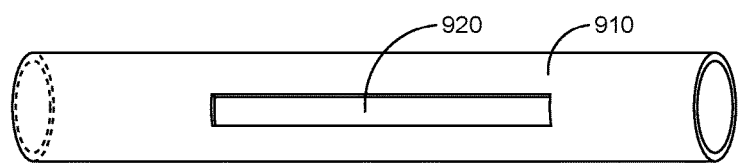
FIG. 9 shows a pipe that may be used as a wastewater supply or leaching channel outrigger support as may be employed in embodiments.

FIG. 9 shows a support outrigger 910 as may be employed in embodiments. Various configurations of support outriggers may be employed. In preferred embodiments, a support outrigger can serve as a conduit for fluid flow from the leaching chamber and discharge into the receiving leaching channel. In this instance, the support outrigger is a pipe and has a rectangular section 920 of pipe removed. This section of pipe is oriented such that water will enter the permeable core of a leaching channel such that large volumes may quickly enter the high aspect ratio channel or other discharge receptacle from the outrigger support.

Figure 10:
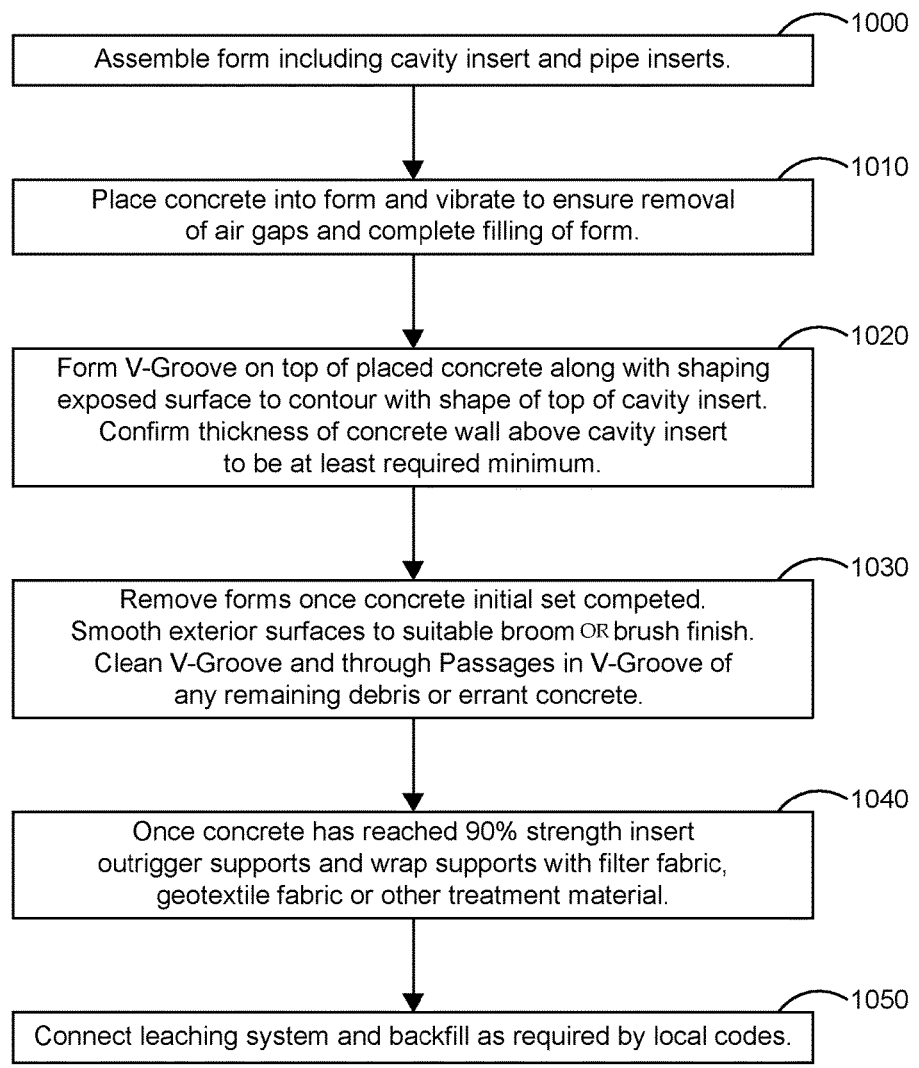
FIG. 10 shows a process for manufacturing and installing leaching chambers and leaching channels as may be employed in embodiments.

FIG. 10 shows a process as may be employed in embodiments. Processes of embodiments may include various actions and considerations including more, less, and various other ones than shown in FIG. 10. The boxes depicted in FIG. 10 include assembling the form as shown at 1000, placing concrete within the form as shown at 1010, forming a recess, such as a v-groove at 1020, removing the forms as shown at 1030, adding the support outriggers and wrapping them 1040, and backfilling the assembled wastewater treatment system, as shown at 1050.

Figure 11A:
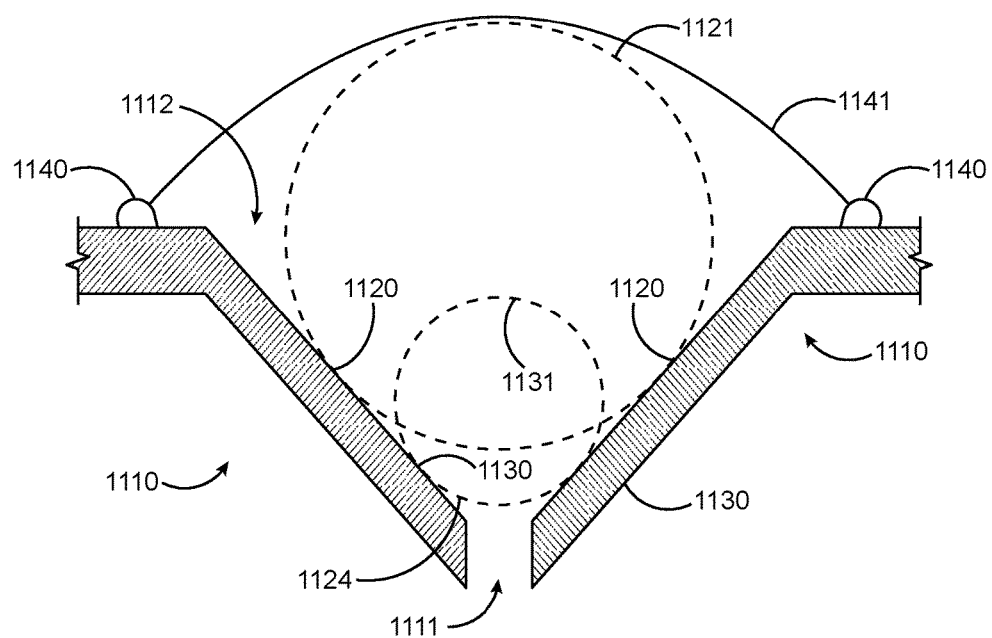
FIGS. 11a-11b show cross-sections of various recesses as may be employed in embodiments.
Figure 11B:
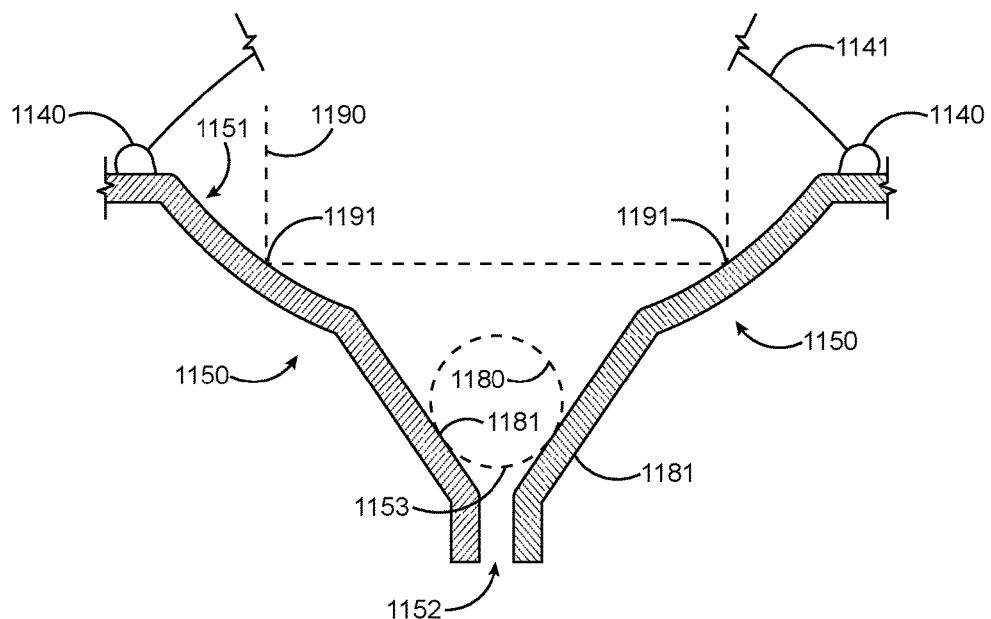

FIGS. 11a and 11b show cross-sections of two recesses as may be employed in embodiments. As can be seen, recesses 1110 and 1150 in embodiments can take on various configurations including being V shaped as in FIG. 11a and having multiple shapes as in FIG. 11b. In FIG. 11b, the recess 1150 has an upper portion that is arc shaped and a lower portion that is v shaped. These different configurations may be used to accommodate different shaped or different sized wastewater supplies. FIG. 11b shows the wastewater supplies as 1190 and 1180 while the wastewater supplies in FIG. 11a are shown at 1121 and 1131. A sealing surface(s) 1120, 1130, 1181, and 1191 may preferably be formed between the wastewater suppl(ies) and the recess. This sealing surface(s) may act to prevent overburden or other materials from passing below the wastewater supply and into the passage 1152 and 1111 of the recess. Gaps 1124 and 1153 are also shown in FIGS. 11a and 11b. This gap may also be protected from overburden by the sealing surface formed between the supply and the recess. Anchors 1140 may be used to secure a tie down strap 1141, chain, line, rope, bar, or other securement apparatus to the chamber and to apply downward force on the wastewater supply and towards the recess. This downward force may be beneficial to maintain a downward sealing force during installation, including before and while backfill is being placed over the water supply and the leaching chamber as well as other components of the wastewater treatment system. The receiving side 1112 of the recess 1110 and the receiving side 1151 of the recess 1150 are also labelled in FIGS. 11a and/or 11b.

In FIG. 11b the first portion of the recess is shown with a curve or arc while the second portion of the recess is shown with a straight slope. Different curved portions or different slopes may also be used in embodiments. In embodiments, curved portions of the recess may have different radii of curvature with curves having larger radii being placed above curves with smaller radii. By positioning the larger curves or arcs above the tighter curves or arcs the different slopes or other configurations of the recess may also be used in embodiments. Thus, in embodiments, a recess may have multiple different curves or slopes or other profiles, e.g., 3, 4, 5, etc., for accepting various size wastewater supplies where portions of the recess are curved, straight, etc., and further modified to accommodate different sized wastewater supplies.

Figure 12:
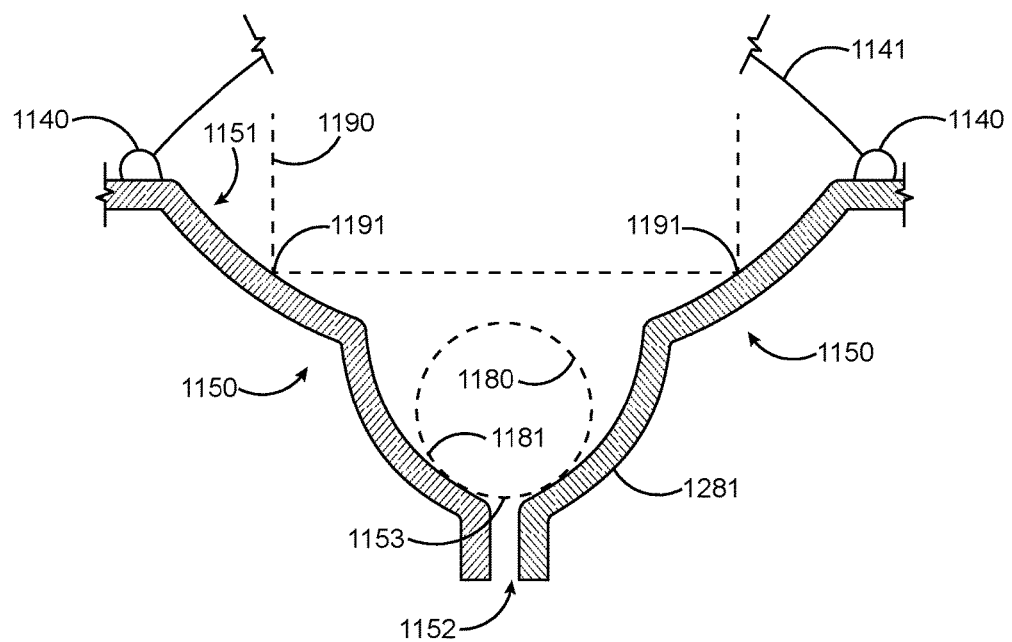
FIG. 12 shows a cross-section of a recess as may be employed in embodiments.

In FIG. 12 the recess 1150 has a first curved portion and a second curved portion 1281, the second curved portion sitting below the first curved portion and the second curved portion having a radius of curvature that is smaller than the first curved portion. Shared features in FIG. 12 and FIG. 11B, use the same numbering.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

It should be noted that the terms "first", "second", and "third", and the like may be used herein to modify elements performing similar and/or analogous functions. These modifiers do not imply a spatial, sequential, or hierarchical order to the modified elements unless specifically stated.

The description of the embodiments of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A wastewater treatment system comprising:
a leaching chamber with one or more wall(s), a top portion, and a chamber, the top portion configured with a wastewater supply receiving recess, the recess having one or more passages configured to receive wastewater from a wastewater supply conduit positioned in the recess and to pass the received wastewater through at least one of the passages and into the chamber; and
a wastewater supply conduit comprising a plurality of wastewater discharge orifices, the wastewater supply conduit sitting in the recess of the leaching chamber, the discharge orifices positioned to discharge into a gap created by the mating of the wastewater supply conduit and the recess, the gap at least in part protected from soil infiltration by the mating of the wastewater supply conduit and a surface of the recess.

2. The wastewater treatment system of claim 1 wherein the wastewater supply conduit is a circular pipe and the recess has a depth of at least $9/10$ the diameter of the wastewater supply conduit.

3. The wastewater treatment system of claim 1 wherein the leaching chamber comprises concrete and the recess is in a "V" shape.

4. The wastewater treatment system of claim 1 wherein the leaching chamber has a length and the mating of the wastewater supply conduit and the recess runs along at least a portion of the length of the leaching chamber.

5. The wastewater treatment system of claim 1 wherein the leaching chamber has an overall exterior shape that is circular, semicircular or rectangular or square.

6. The wastewater treatment system of claim 1 wherein the leaching chamber is comprised of plastic.

7. The wastewater treatment system of claim 1 wherein the wastewater supply conduit comprises a plurality of circular discharge orifices having diameters of at least one of $1/8"$ or $1/4"$ or $1/2"$ or $3/4"$ or $1"$ and wherein the wastewater supply conduit is gravity fed or pressurized or both.

8. The wastewater treatment system of claim 1 further comprising:
a plurality of leaching channels, the leaching channels extending outwardly from one of the walls of the leaching chamber, the leaching channels each comprising an outrigger support, and each of the leaching channels having a height to width aspect ratio of 3, or 96, or between 3 and 96.

9. The wastewater treatment system of claim 8 wherein each of the leaching channels comprises a geotextile fabric surrounding a majority of the leaching channel.

10. The wastewater treatment system of claim 9 wherein the geotextile fabric positioned to interface with a surrounding medium when the leaching chamber is installed and operational.

11. A wastewater treatment system comprising:
a leaching chamber with one or more upright wall(s), a top portion, and an open-bottom chamber, the top portion configured with an externally exposed wastewater supply receiving recess, the recess having one or more passages configured to receive wastewater from a wastewater supply conduit positioned in the recess and to pass the received wastewater through at least one of the passages and into the chamber;
a wastewater supply conduit with a plurality of wastewater discharge orifices, the wastewater supply conduit sitting in the recess of the leaching chamber, the discharge orifices positioned to discharge into a gap created by the mating of the wastewater supply conduit and the recess, the gap at least in part protected from soil infiltration by the mating of the wastewater supply conduit and a surface of the recess; and
a plurality of leaching channels, the leaching channels extending outwardly from at least one of the walls of the leaching chamber, the leaching channels each comprising an outrigger support, and each of the leaching channels having a height to width aspect ratio of 3, or 96, or between 3 and 96.

12. The wastewater treatment system of claim 11 wherein the leaching chamber comprises concrete and the outrigger support comprises a pipe.

13. The wastewater treatment system of claim 11 wherein the leaching chamber includes one or more tie down anchors, the anchors accessible and positioned to receive a tie down element for securing the wastewater supply conduit into the recess.

14. The wastewater treatment system of claim 11 wherein the plurality of leaching channels comprise a geotextile outer perimeter, the geotextile serving as an interface for wastewater leaching from the leaching channel into any surrounding Infiltration and Treatment Medium (ITM).

15. The wastewater treatment system of claim 11 wherein the recess has a sloped portion and a curved portion.

16. The wastewater treatment system of claim 11 wherein the recess has a first curved portion and a second curved portion, the second curved portion sitting below the first curved portion and the second curved portion having a radius of curvature that is smaller than the first curved portion.

17. A wastewater treatment system comprising:
a leaching chamber with one or more wall(s) and a top portion, the top portion configured with an externally exposed wastewater supply receiving recess, the recess having one or more passages configured to receive wastewater from a wastewater supply conduit positioned in the recess and to pass the received wastewater through at least one of the passages and into the chamber;

a wastewater supply conduit with a plurality of wastewater discharge orifices, the wastewater supply conduit sitting in the recess of the leaching chamber, the discharge orifices positioned to discharge into a gap created by the mating of the wastewater supply conduit and the recess, the gap at least in part protected from soil infiltration by the mating of the wastewater supply conduit and a surface of the recess; and a plurality of leaching channels, the leaching channels extending outwardly from one or more of the walls of the leaching chamber.

18. The wastewater treatment system of claim 17 wherein the leaching chamber comprises concrete.

19. The wastewater treatment system of claim 17 wherein the leaching chamber includes one or more tie down anchors, the anchors accessible and positioned to receive a tie down element for securing the wastewater supply conduit into the recess.

20. The wastewater treatment system of claim 17 wherein the plurality of leaching channels comprise a geotextile outer perimeter, the geotextile serving as an interface for wastewater leaching from the leaching channel into any surrounding Infiltration and Treatment Medium (ITM).

\* \* \* \* \*